United States Patent
Lee

(10) Patent No.: US 11,343,299 B2
(45) Date of Patent: May 24, 2022

(54) METHOD AND SYSTEM FOR REAL TIME MEASURING QUALITY OF VIDEO CALL SERVICE

(71) Applicant: LINE Plus Corporation, Seongnam-si (KR)

(72) Inventor: Dongwon Lee, Seongnam-si (KR)

(73) Assignee: LINE PLUS CORPORATION, Gyeonggi-do (KR)

(*) Notice: Subject to any disclaimer, the term of this patent is extended or adjusted under 35 U.S.C. 154(b) by 371 days.

(21) Appl. No.: 16/453,200

(22) Filed: Jun. 26, 2019

(65) Prior Publication Data

US 2020/0007605 A1 Jan. 2, 2020

(30) Foreign Application Priority Data

Jul. 2, 2018 (KR) .................. 10-2018-0076566

(51) Int. Cl.
| | |
|---|---|
| *H04L 1/00* | (2006.01) |
| *H04L 65/80* | (2022.01) |
| *H04N 7/14* | (2006.01) |
| *H04L 41/50* | (2022.01) |
| *H04L 41/5009* | (2022.01) |

(52) U.S. Cl.
CPC .......... *H04L 65/80* (2013.01); *H04L 41/5009* (2013.01); *H04L 41/509* (2013.01); *H04N 7/147* (2013.01)

(58) Field of Classification Search
CPC .............................. H04L 65/80; H04L 65/602
See application file for complete search history.

(56) References Cited

U.S. PATENT DOCUMENTS

| | | | | |
|---|---|---|---|---|
| 2011/0311147 | A1* | 12/2011 | Pahalawatta | G06T 7/0002 382/197 |
| 2013/0060908 | A1* | 3/2013 | Whitmyer, Jr. | H04N 21/25841 709/219 |
| 2013/0318253 | A1* | 11/2013 | Kordasiewicz | H04L 65/605 709/231 |
| 2017/0237986 | A1* | 8/2017 | Choi | H04W 4/80 348/14.02 |

FOREIGN PATENT DOCUMENTS

| | | | | |
|---|---|---|---|---|
| KR | 20080099903 A | * | 3/2008 | ............ H04N 17/00 |
| KR | 20080099903 A | | 11/2008 | |
| KR | 20090065022 A | | 6/2009 | |
| KR | 10-2018-0045726 A | | 5/2018 | |

OTHER PUBLICATIONS

NPL: "Robustness of Speech Quality Metrics", IEEE, 2013.*
Korean Office Action for Korean Application No. 10-2018-0076566 dated Jun. 5, 2019.

* cited by examiner

Primary Examiner — Abdelillah Elmejjarmi
(74) Attorney, Agent, or Firm — Harness, Dickey & Pierce, P.L.C.

(57) ABSTRACT

Provided is a method of measuring quality of a video call between a transmitting terminal including processing circuitry and a receiving terminal, the method including processing, by the processing circuitry, original frames included in an original video based on a video call service; replacing, by the processing circuitry, real-time video frames acquired from a camera for a video call with a receiving terminal with at least a portion of the original frames; and transmitting, by the processing circuitry, the portion of the original frames to the receiving terminal as frames for the video call with the receiving terminal through the video call service.

12 Claims, 8 Drawing Sheets

METHOD AND SYSTEM FOR REAL TIME MEASURING QUALITY OF VIDEO CALL SERVICE

CROSS-REFERENCE TO RELATED APPLICATION(S)

This U.S. non-provisional application claims the benefit of priority under 35 U.S.C. § 119 to Korean Patent Application No. 10-2018-0076566 filed on 2018 Jul. 2, in the Korean Intellectual Property Office (KIPO), the entire contents of which are incorporated herein by reference.

BACKGROUND

Field

One or more example embodiments relate generally to a method and system for measuring quality of a video call service in real time.

Description of Related Art

With the development of a mobile Internet environment, high-speed/large-capacity mobile service is popular. In particular, a very fast transition from existing voice-based calls to video-based calls is in progress. Also, the development of various services in a video call environment has triggered a discussion of a new business model, which accordingly may involve standards and evaluation methods for quality of a video call service. In response to an occurrence of a service quality issue, it may be advantageous to quickly verify and cope with a cause and to perform evaluation and monitoring as to whether quality of a service being provided to an end user meets a desired level.

Although demand for measuring quality of a mobile video call service an actual user experiences is on the continuous increase, research or standards may be suitable for a unidirectional service such as an Internet Protocol television (IPTV) or a streaming video service, but may be difficult to directly apply to a real-time bidirectional service.

SUMMARY

One or more example embodiments include a video call quality measurement method and a video call quality measurement system that may replace real-time video frames acquired from a camera of a transmitting terminal with an original video and transmit the original video during a video call, may analyze the original video received at a receiving terminal, and/or may measure quality of a video call service.

One or more example embodiments include a video call quality measurement method and a video call quality measurement system that may generate a quality index with respect to all of a full-reference (FR) method and/or a no-reference (NR) method based on original frames of a received original video and an index and/or a timestamp of each original frame.

One or more example embodiments may include a video call quality measurement method and a video call quality measurement system that may provide contents to terminals during a video call by replacing a real-time video frame acquired from a camera based on a location with an original video.

According to at least one example embodiment, there is provided a method of measuring quality of a video call at a transmitting terminal including processing circuitry, the method including: processing, by the processing circuitry, original frames included in an original video based on a video call service; replacing, by the processing circuitry, real-time video frames acquired from a camera for a video call with a receiving terminal with at least a portion of the original frames; and transmitting, by the processing circuitry, the portion of the original frames to the receiving terminal as frames for the video call with the receiving terminal through the video call service.

The processing may include processing each of the original frames included in the original video based on at least one of a frame rate and/or a resolution of the video call service.

The transmitting may include transmitting the portion of the original frames to the receiving terminal through the video call service such that the receiving terminal or an analysis terminal linked with the receiving terminal determines (e.g., calculates, estimates, classifies, measures, etc.) the quality index of the video call service based on the portion of the original frames.

The receiving terminal or an analysis terminal linked with the receiving terminal may be configured to determine a first quality index using a full-reference (FR) method based on the portion of the original frames and the original frames included in the original video, to determine a second quality index using a no-reference (NR) method based on the portion of the original frames, and to generate a final quality index of the video call service based on (e.g., by combining) the first quality index and the second quality index.

The original frames included in the original video may be generated to include indices for the original frames, and the receiving terminal or the analysis terminal may be configured to determine the first quality index using a full-reference method based on each of the portion of the original frames and an original frame of the original video having an index corresponding thereto.

The receiving terminal or the analysis terminal may be configured to determine the second quality index using the NR method based on the portion of the original frames and/or a timestamp associated with each frame of the portion of the original frames.

The timestamp may include at least one of a time at which a corresponding original frame is transmitted from the transmitting terminal and/or a time at which the corresponding original frame is received at the receiving terminal.

According to an aspect of at least one example embodiment, there is provided a method of measuring quality of a video call at a receiving terminal including processing circuitry, the method including receiving, by the processing circuitry and from a transmitting terminal, at least a portion of original frames included in an original video through a video call service, the at least a portion of the original frames being received through the video call service by replacing real-time video frames acquired from a camera for the video call service with the at least a portion of the original frames at the transmitting terminal; and processing, by the processing circuitry, quality of the video call service based on the portion of the original frames.

According to an aspect of at least one example embodiment, there is provided a method of configuring a content providing server including processing circuitry to provide content during a video call between a first terminal and a second terminal, the method including storing, by the processing circuitry, an original video for each location in a database; acquiring, by the processing circuitry, location information on at least one of the first terminal and the second terminal between which the video call is in progress;

detecting, by the processing circuitry, an original video corresponding to the acquired location information from the database; and transmitting, by the processing circuitry, the detected original video to at least one of the first terminal and the second terminal.

According to an aspect of at least one example embodiment, at least one of the first terminal and the second terminal may replace real-time video frames acquired from a camera with at least a portion of original frames included in the detected original video and displays or transmits the portion of the original frames.

According to an aspect of at least one example embodiment, there is provided a non-transitory computer-readable recording medium storing instructions that, when executed by processing circuitry, cause the processing circuitry to perform the video call quality measurement method.

According to an aspect of at least one example embodiment, there is provided a transmitting terminal, including processing circuitry, wherein the processing circuitry is configured to process original frames included in an original video based on a video call service, replace real-time video frames acquired from a camera for a video call with a receiving terminal with at least a portion of the original frames, and transmit the portion of the original frames to the receiving terminal as frames for the video call with the receiving terminal through the video call service, to determine a quality index of the video call service.

According to an aspect of at least one example embodiment, there is provided a receiving terminal including processing circuitry, wherein the processing circuitry is configured to receive, from a transmitting terminal, at least a portion of original frames among original frames included in an original video through a video call service, the at least a portion of the original frames being received through the video call service by replacing real-time video frames acquired from a camera for the video call service with the at least a portion of the original frames at the transmitting terminal, and process quality of the video call service based on the portion of the original frames.

According to some example embodiments, it is possible to replace real-time video frames acquired from a camera of a transmitting terminal with a portion of an original video and transmit the portion of the original video during a video call, to analyze the original video received at a receiving terminal, and to measure quality of a video call service.

According to some example embodiments, it is possible to generate a quality index with respect to all of a full-reference (FR) method and a no-reference (NR) method based on original frames of a received original video and an index and a timestamp of each original frame.

According to some example embodiments, it is possible to provide contents to terminals during a video call by replacing a real-time video frame acquired from a camera based on a location with an original video.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
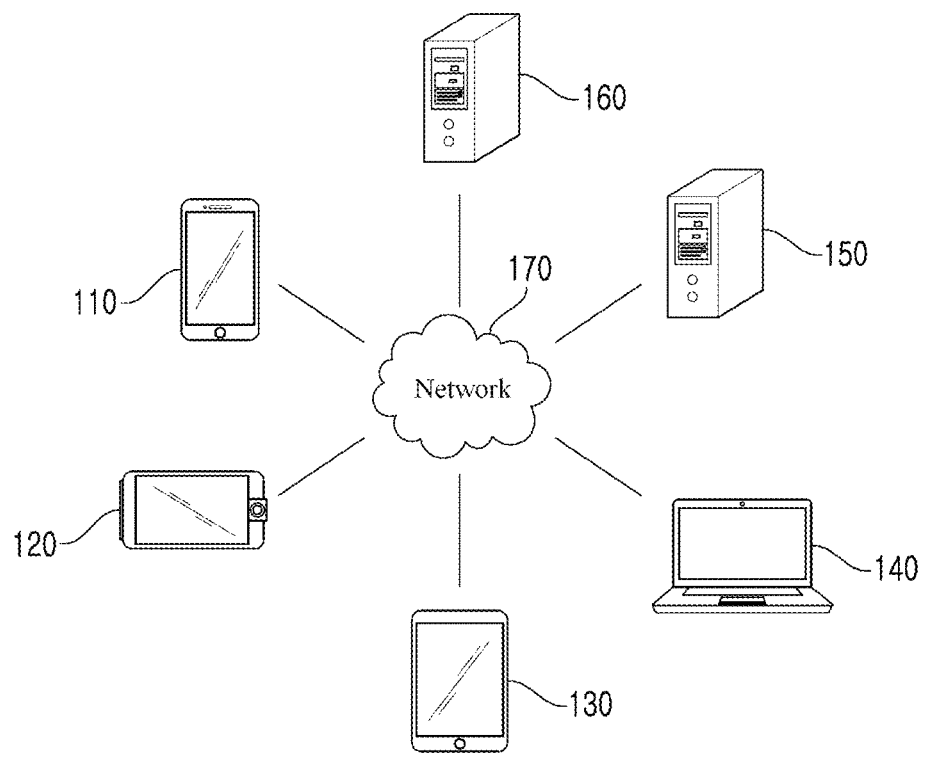
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using processing circuitry, which may include hardware such as logic circuits; a hardware/software combination, such as a processor executing software; or a combination thereof. For example, a processor may include, but is not limited to, a Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, a computer processing device (such as a transmitting terminal, a receiving terminal, an analysis terminal, and/or a content providing server) may include processing circuitry that may be configured to carry out program code by performing arithmetical, logical, and input/output operations, according to the program code. Once the program code is loaded into a computer processing device, the processing circuitry may be programmed to perform the program code, thereby transforming the computer processing device into a special purpose computer processing device. In a more specific example, when the program code is loaded into processing circuitry, the processing circuitry becomes programmed to perform the program code and operations corresponding thereto, thereby transforming the processing circuitry into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing some example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or processing circuitry from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of some example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include various forms of processing circuitry, including (for example) multiple processors or a processor and a controller. In addition, other processing configurations of processing circuitry are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A system according to some example embodiments may be configured through at least one computer apparatus, which is described below, and a method according to some example embodiments may be performed by the at least one computer apparatus. Here, a computer program according to some example embodiments may be installed and executed on the computer apparatus. The computer apparatus may perform the method according to some example embodiments under control of the executed computer program. The computer program may be stored in a non-transitory computer-readable medium to perform the method on the computer apparatus in conjunction with the computer apparatus.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto. Also, the network environment of FIG. 1 is provided to describe one of environments applicable to some example embodiments and an environment applicable to some example embodiments is not limited to the network environment of FIG. 1.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), and a tablet personal computer (PC). For example, although FIG. 1 illustrates a shape of a smartphone as an example of the electronic device 110, the electronic device 110 may refer to one of various physical computer apparatuses capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a service, for example, a video call service, a financial service, a payment service, a social network service (SNS), a messaging service, a search service, a mail service, and a content providing service, to the plurality of electronic devices 110, 120, 130, and/or 140 over the network 170.

Figure 2:
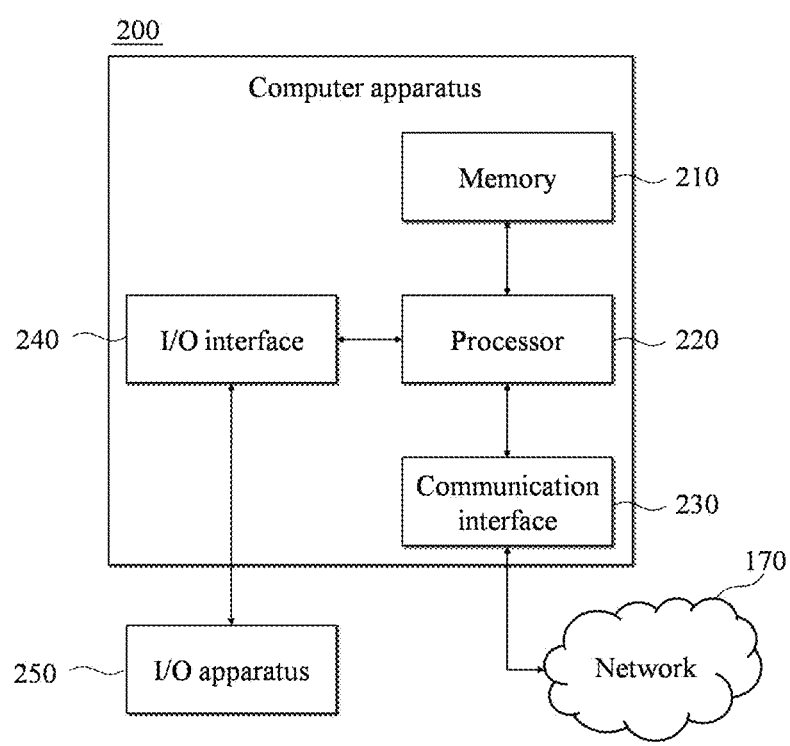
FIG. 2 illustrates an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be configured through a computer apparatus 200 of FIG. 2. A method according to some example embodiments may be performed by the computer apparatus 200.

Referring to FIG. 2, the computer apparatus 200 may include a memory 210, processing circuitry 220, a communication interface 230, and an input/output (I/O) interface 240. The memory 210 may include a permanent mass storage device, such as random access memory (RAM) and read only memory (ROM), as a non-transitory computer-readable storage medium. Here, the permanent mass storage device, such as ROM and a disk drive, may be included in the computer apparatus 200 as a permanent storage device separate from the memory 210. Also, an OS or at least one program code may be stored in the memory 210. Such software components may be loaded to the memory 210 from another non-transitory computer-readable storage medium separate from the memory 210. The other non-transitory computer-readable storage medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, software components may be loaded to the memory 210 of the computer apparatus 200 based on a computer program installed by files provided over the network 170.

In some example embodiments, the processing circuitry 220 may be configured to process computer-readable instructions of a computer program by performing basic arithmetic operations, logic operations, and I/O operations. The computer-readable instructions may be provided from the memory 210 or the communication interface 230 to the processing circuitry 220. For example, the processing circuitry 220 may be configured to execute received instructions in response to a program code stored in the storage device, such as the memory 210.

The communication interface 230 may be configured to provide a function for communication between the computer apparatus 200 and another apparatus, for example, the aforementioned storage devices, over the network 170. For example, the processing circuitry 220 of the computer apparatus 200 may be configured to transfer a request or an instruction, created based on a program code stored in a storage device, such as the memory 210, to other devices over the network 170 under control of the communication interface 230. Inversely, a signal, an instruction, data, a file, etc., from another apparatus may be received at the computer apparatus 200 by going through the communication interface 230 of the computer apparatus 200 and the network 170. For example, a signal, an instruction, data, etc., received through the communication interface 230 may be transferred to the processing circuitry 220 or the memory 210, and content, a file, and the like, may be stored in a storage medium, for example, the aforementioned permanent storage device, further includable in the computer apparatus 200.

The I/O interface 240 may be configured as a device used for interface with an I/O apparatus 250. For example, an input device may include a device, such as a microphone, a keyboard, a camera, and a mouse, and an output device may include a device, such as a display and a speaker. As another example, the I/O interface 240 may be configured as a device for interface with an apparatus in which an input function and an output function are integrated into a single function, such as a touchscreen. The I/O apparatus 250 may be configured as a single apparatus with the computer apparatus 200.

According to some other example embodiments, the computer apparatus 200 may include a greater or smaller number of components than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
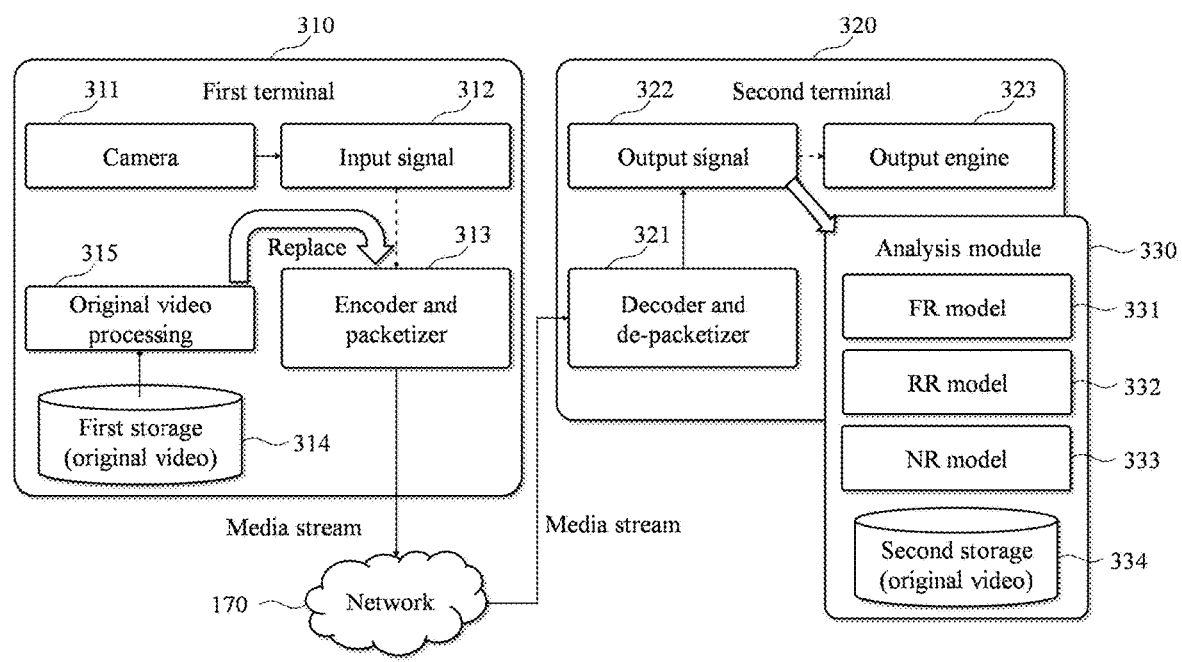
FIG. 3 illustrates an example of a video call quality measurement process according to at least one example embodiment.

FIG. 3 illustrates an example of a video call quality measurement process according to at least one example embodiment. In FIG. 3, it is assumed that a video call between a first terminal 310 and a second terminal 320 is in progress. Each of the first terminal 310 and the second terminal 320 may be configured as a transmitting terminal and/or a receiving terminal of media, for example, video and/or audio, for a video call. Here, a process of transmitting media from the first terminal 310 as the transmitting terminal to the second terminal 320 as the receiving terminal is described with reference to FIG. 3. As used herein, "transmitting" and "receiving" may involve one or more forms of wired communication, such as Ethernet or coaxial cable; one or more forms of wireless communication, such as WiFi or cellular communication; or a combination of wired and wireless communication. Additionally, a transmitting terminal and a receiving terminal may utilize the same form of wired and/or wireless communication or may utilize different forms of wired and/or wireless communication, such as transmission by the transmitting terminal over a wired connection and reception by the receiving terminal over a wireless connection.

During a video call process, the first terminal 310 may be configured to generate a media stream by encoding and packetizing an input signal 312 for a video captured through a camera 311, through an encoder and packetizer 313, and may be configured to transmit the generated media stream to the second terminal 320 over the network 170. The media stream may be transmitted from the first terminal 310 to the second terminal 320 through a server (not shown) that is configured to provide a video call service based on a type of the video call service. Here, the second terminal 320 may be configured to generate an output signal 322 by decoding and/or de-packetizing the media stream received from the first terminal 310, through a decoder and de-packetizer 321. During the general video call process, the second terminal 320 may be configured to output the output signal 322 through an output engine 323 such that a video and/or audio for the video call may be output from the second terminal 320. Also, the second terminal 320 may be configured to transmit the video and/or audio for the video call to the first terminal 310 in a similar manner such that the first terminal 310 may output the video and the audio. In this manner, the video call service may be provided between the first terminal 310 and the second terminal 320.

In the example embodiment of FIG. 3, to measure quality of the video call service, the first terminal 310 may be configured to transmit an original video stored in a first storage 314 to the second terminal 320 instead of transmitting the input signal 312. As used herein, the term "original" may include, for example, a testing video, such as a test pattern or calibration video. The first terminal 310 may be configured to process the original video through an original video processing 315. For example, since a frame rate and/or resolution of the advance-generated original video may not match a frame rate and/or resolution of the video call service, the first terminal 310 may be configured to process original frames included in the original video through the original video processing 315, such that the frame rate and/or the resolution of the original video may correspond to the frame rate and/or the resolution of the video call service of which quality is to be measured. For example, if a frame rate of a video input through the camera 311 is 15 frames per second (fps) and a frame rate of the original video is 30 fps, the original frame may be replaced by skipping every one frame. If '1, 2, 3, 4, 5, 6, 7, . . . ' are assigned as indices of original frames included in the original video, original frames with indices '1, 3, 5, 7, . . . ' may be replaced with frames of the video input through the camera 311. Also, the first terminal 310 may be configured to replace real-time video frames included as the input signal 312 with at least a portion of the original frames. In this case, the input signal 312 that includes the portion of the original frames may be encoded and/or packetized for transmission to the second terminal 320.

In some example embodiments, the second terminal 320 may be configured to acquire the output signal 322 that includes the portion of the original frames, for example, by decoding and/or de-packetizing the input signal 312 transmitted in the media stream, and/or to measure the quality of the video call service based on the portion of the original frames. Here, to measure the quality of the video call service, the portion of the original frame may be transmitted to an analysis module 330. Depending on example embodiments, the analysis module 330 may be included in the second terminal 320 and/or may be included in a separate analysis terminal (not shown) linked with the second terminal 320. In the example embodiment of FIG. 3, it is assumed that the analysis module 330 is included in the second terminal 320.

Referring to FIG. 3, the analysis module 330 includes a full-reference (FR) model 331, a reduced-reference (RR) model 332, a no-reference (NR) model 333, and a second storage 334. In some example embodiments, the RR model 332 may be omitted. The second storage 334 may be included in the aforementioned separate analysis terminal or the second terminal 320, instead of being included in the analysis module 330.

In some example embodiments such as shown in FIG. 3, the FR model 331 may be used to determine first quality indices for the quality of the video call service using an FR method of finding, from among original frames included in the original video stored in the second storage 334, original frames having the same or corresponding index through indices of the portion of the original frames and then performing an analysis based on the at least a portion of the original frames and at least a portion of the frames of the video input. The FR method refers to a method of directly analyzing an original video and a processed video and measuring quality of the processed video if all of the original video and the processed video are known. For example, the FR method may include a peak signal-to-noise ratio (PSNR). The FR method uses all (or at least a portion) of the original video, for example, the original video stored in the second storage 334, and the processed video, for example, the portion of the original frames. Therefore, the FR method may relatively accurately measure quality of a video recognized by a person, however, may be limitedly applied since the original video is absent in an actual application in many cases. The FR method may include a variety of methods, such as a method of considering a human visual system (HVS) from a PSNR to simply measure a level of distortion (noise) for each pixel and an evaluation method through machine learning. In some example embodiments, a method such as 'Video Codec Testing and Quality Measurement (draft-ietf-netvc-testing-01)' may be used as the FR method. This standardization started in February of 2016 and the FR method has proved its academic and practical use among the methods developed so far. The FR method may be capable of evaluate a level of distortion in an intra-frame, however, may not easily evaluate a distortion in an inter-frame, such as a screen skip, a screen freezing, and a jerkiness. According to example embodiments, evaluation may be performed through combination of the FR method and an NR method in a hybrid manner in consideration of a mobile environment in which Internet situations dramatically change.

In some example embodiments, the NR model 333 may be used to determine second quality indices for the quality of the video call service using the NR method of evaluating a screen skip, a screen freezing, and a blackness, which are difficult to measure using the FR method. The NR method refers to a method of performs a quality evaluation using only the processed video without using any information on the original video. Since the original video is not required, the NR method may be widely applied, however, may not easily measure the quality of video using only the processed video. Here, it may be advantageous to use a method of measuring a blocking phenomenon in a low frequency domain or wavy noise in a high frequency domain, which characteristically appears in a block-based coding method such as Moving Picture Experts Group (MPEG) encoding. In the NR method, it is assumed that noise is or may be present in a video at all times. Such assumption may include a risk that an error may occur in measuring the quality of video. For example, if a chessboard is present in a video, the chessboard may be recognized as block-typed noise although there is no distortion at all. According to some example embodiments, since it may be possible to designate a video to be measured and/or an original video, such an error may be removed. The quality evaluation using the NR method may achieve measuring and evaluating one of metrics measured using the general NR method, such as, for example, a frame rate and/or a resolution of the video call service, an interval between actually transmitted frames, a video skip, a video freezing, a blackness, a jerkiness, etc., using an input video and an inter-video index (e.g., time information). A method of measuring a delay among measured metrics may include a synchronization method for a time between a transmitting terminal and a receiving terminal for an accurate unidirectional delay and a loopback method for inserting again, into a camera, a video signal to be played at the receiving terminal and sending back the same to the transmitting terminal. In general, the synchronization method may use a global positioning system (GPS). However, in the case of an indoor measurement to which a satellite does not apply, a method of using a network time protocol (NTP) may be used. If a timestamp N value transmitted from a synchronized transmitting terminal is detected from a timestamp M value of a receiving terminal, a delay may be determined as a value of M-N. The delay measurement may be performed several times and statistical features, such as mean and standard deviation, may be evaluated. The loopback method may be used for a call using a circuit switch method and some jitter may occur in a packet switch method in which a network characteristic varies. However, since many video call services using the Internet have a delay of about 400 to 700 ms, the loopback method may have an inaccuracy of about 10%. A delay value shows an approximate trend and thus, there may be an inaccuracy of about 10%. If a timestamp N value transmitted from a non-synchronized transmitting terminal is looped back from a receiving terminal and is detected again from a timestamp L value of the transmitting terminal, the delay may be determined as a value of (L-N)/2. Even in this case, the delay measurement may be performed several times and statistical features, such as mean and standard deviation, may be evaluated. If a delay value is used not as an absolute evaluation method but as a relative evaluation method such as a service stability evaluation method, for example, standard deviation and a peak/mean ratio, the loopback method may also provide a significant metric. Since a block-discrete cosine transform (DCT) video coding method, such as H.26X and MPEG, performs transform coding using a block fixed to, for example, 8×8 or 4×4, block noise may occur in this structure. It may be advantageous to use methods of estimating a level of noise included in a video based on block noise using the above attribute. According to some example embodiments, a level of distortion may be measured by extracting an edge present in a video through a Sobel operation and/or by determining the edge and an energy ratio within the edge relative to a vertical axis and a horizontal axis. Additionally, in some example embodiments, the evaluation performance may be enhanced into consideration of a block flatness, a texture masking effect based on a human visual system feature, and a luminance adaption. A video skip and a frame rate may be determined, for example, based on a regularity of frame count information of an input video. For example, if a frame count increases by each 2 such as '1, 3, 5, 7 . . . ,' it can be known that a frame rate of an original video is ½ of 30 fps. If the frame count does not regularly increase, it may indicate that a video is skipped due to an occurrence of a packet error by an unstable network environment. Based on a ratio of a skipped frame per unit time, a skip level may be measured using statistical features. If a plurality of skips occurs, the frame count may increase stepwise instead of increasing in proportion to timestamp information, which may cause video freezing. For example, if an appropriate weight sum is applied to a ratio of a sum of the total freezing and each freezing ratio during a desired period of time, a freezing level may be measured.

The RR method refers to a method of measuring quality of a processed video using features extracted from each video although none of the original video and the processed video are present. To use the RR method, the first terminal 310 may be configured to extract features from the respective portion of the original frames and/or to transmit the extracted features to the second terminal 320, and the RR model 332 may be used to measure the quality of the processed video using the features received by the second terminal 320. Here, two types of applications may be applied. One example embodiment relates to a quality evaluation on a receiving side. In a unidirectional communication network, the receiving terminal may be configured to decode a compressed video and/or to extract features of a processed video from the decoded video when encoded video data and features of an original video are transmitted. The quality of the processed video may be measured based on features of the processed video and features of the original video. Another example embodiment relates to a quality evaluation on a transmitting side. In a bidirectional communication network, the receiving terminal may be configured to extract features of the decoded video and/or to transmit the extracted features to the transmitting terminal through a return channel. The transmitting terminal may be configured to monitor the quality of the processed video based on features of the original video and the returned features of the processed video.

Figure 4:
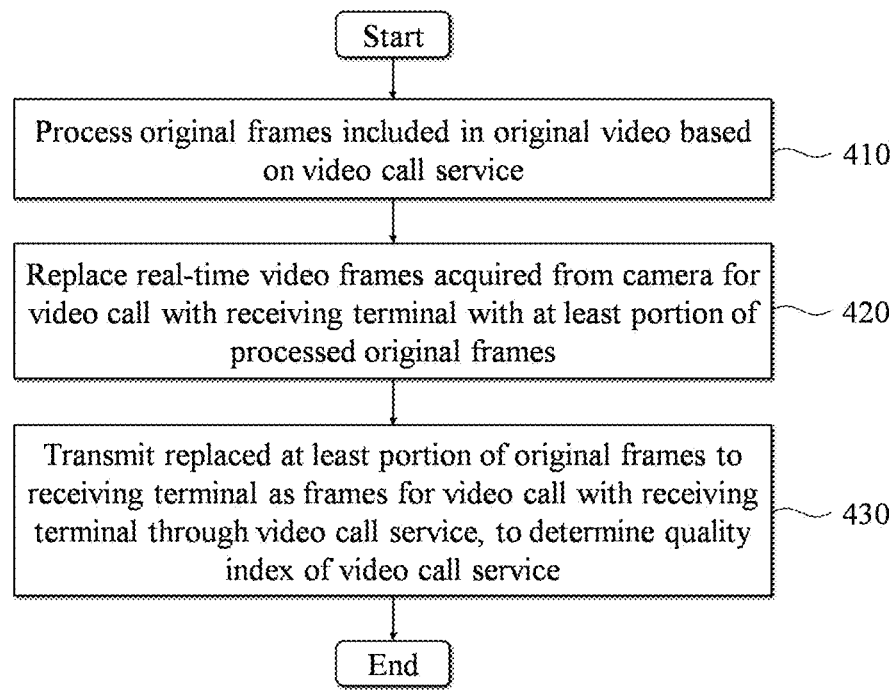
FIG. 4 is a flowchart illustrating an example of a video call quality measurement method from perspective of a transmitting terminal according to at least one example embodiment.

FIG. 4 is a flowchart illustrating an example of a video call quality measurement method from perspective of a transmitting terminal according to at least one example embodiment. The video call quality measurement method of FIG. 4 may be performed by the computer apparatus 200 including processing circuitry, wherein the first terminal 310 is configured as the transmitting terminal. For example, the processing circuitry 220 of the computer apparatus 200 may be configured to execute a control instruction according to a code of at least one program or a code of an OS included in the memory 210. Here, the processing circuitry 220 may be configured to control the computer apparatus 200 to perform operations 410 to 430 included in the method of FIG. 4 in response to a control instruction provided from a code stored in the computer apparatus 200. Hereinafter, an example embodiment in which the first terminal 310 configured by the computer apparatus 200 performs the method of FIG. 4 is described with reference to FIG. 4.

Referring to FIG. 4, in operation 410, the processing circuitry of the first terminal 310 may process original frames included in an original video based on a video call service. As described above, processing of the original video may be or may include a process of processing original frames of the original video to match a frame rate and/or resolution of the video call service to transmit a portion of the original video to the second terminal 320 through the video call service.

In operation 420, the processing circuitry of the first terminal 310 may replace real-time video frames acquired from a camera for a video call with a receiving terminal with at least a portion of the original frames. For example, to transmit an original video of 30 fps through a video call service of 15 fps, every two original frames of the original video may be replaced with each single real-time video frame acquired from a camera. Here, the receiving terminal may correspond to the aforementioned second terminal 320.

In operation 430, the processing circuitry of the first terminal 310 may transmit the portion of the original frames to the receiving terminal as frames for the video call with the receiving terminal through the video call service, to determine a quality index of the video call service. For example, in operation 430, the processing circuitry of the first terminal 310 may be configured to transmit the portion of the original frames to the receiving terminal through the video call service. The receiving terminal or an analysis terminal linked with the receiving terminal (including processing circuitry thereof) may be configured to determine the quality index of the video call service based on the portion of the original frames. Such transmission of the portion of the original frame may provide the receiving terminal, that is, the second terminal 320 with a capability of measuring the quality of the video call service through the aforementioned FF method, RR method, and/or NR method.

According to some example embodiments, processing circuitry of the receiving terminal and/or the analysis terminal may be configured to determine a first quality index using an FR method based on the portion of the original frames to the original frames included in the original video, to determine a second quality index using an NR method based on the portion of the original frames, and/or to generate a final quality index of the video call service based on (e.g., by combining) the first quality index and the second quality index. For example, original frames included in the original video may be generated to include indices for the original frames. The indices may include time information and/or order information associated with playing of the original frames. Here, the processing circuitry of the receiving terminal and/or the analysis terminal may be configured to determine the first quality index using the FR method based on each of the portion of the original frames to an original frame of the original video having the same index thereto. Also, the processing circuitry of receiving terminal and/or the analysis terminal may be configured to determine the second quality index using the NR method based on the portion of the original frames and a timestamp associated with each frame of the portion of the original frames. Here, the timestamp may include at least one of a time at which a corresponding original frame is transmitted from the first terminal 310 that is the transmitting terminal and a time at which the corresponding original frame is received at the receiving terminal.

Figure 5:
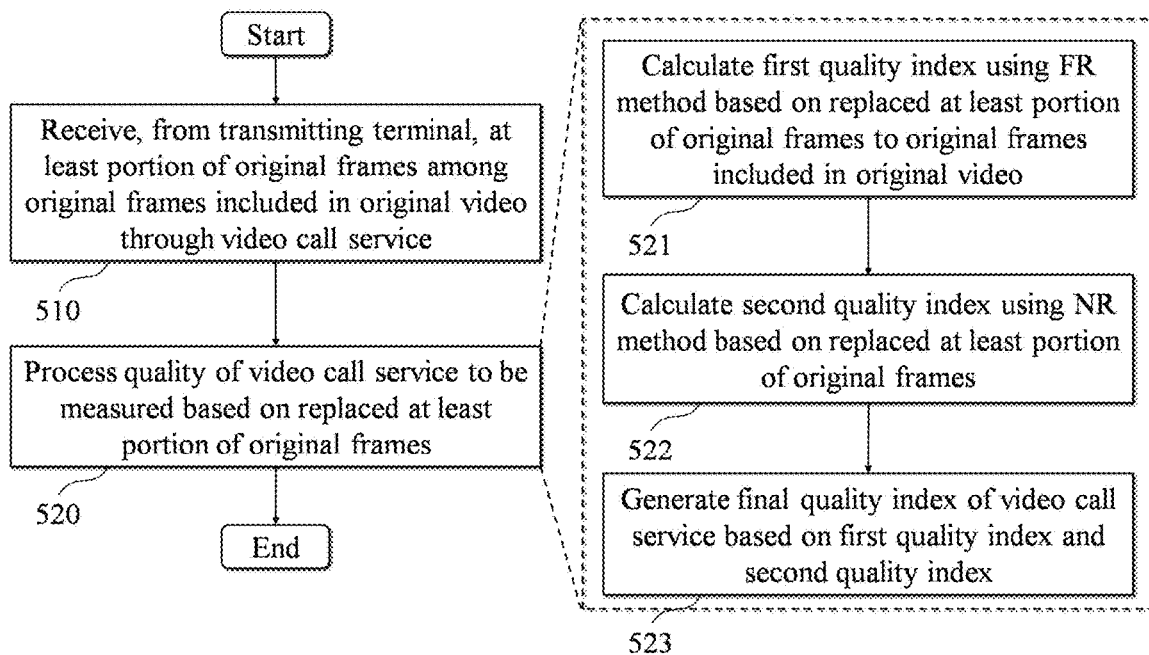
FIG. 5 is a flowchart illustrating an example of a video call quality measurement method from perspective of a receiving terminal according to at least one example embodiment.

FIG. 5 is a flowchart illustrating an example of a video call quality measurement method from perspective of a receiving terminal including processing circuitry according to at least one example embodiment. The video call quality measurement method of FIG. 5 may be performed by processing circuitry of the computer apparatus 200 that configures the second terminal 320 as the receiving terminal. For example, the processing circuitry 220 of the computer apparatus 200 may be configured to execute a control instruction according to a code of at least one program or a code of an OS included in the memory 210. Here, the processing circuitry 220 may be configured to control the computer apparatus 200 to perform operations 510 and 520 included in the method of FIG. 5 in response to a control instruction provided from a code stored in the computer apparatus 200. Hereinafter, an example embodiment in which the second terminal 320 configured by the computer apparatus 200 performs the method of FIG. 5 is described with reference to FIG. 5.

Referring to FIG. 5, in operation 510, the processing circuitry of the second terminal 320 may receive, from a transmitting terminal, at least a portion of original frames included in an original video through a video call service. Here, the transmitting terminal may correspond to the aforementioned first terminal 310 and the at least a portion of the original frames may be received through the video call service by replacing real-time video frames acquired from a camera for the video call service with the at least a portion of the original frames at the transmitting terminal In operation 520, the processing circuitry of the second terminal 320 may process quality of the video call service to be measured based on the portion of the original frames. If the quality measurement is performed through an analysis terminal separate from the second terminal 320, the second terminal 320 may simply transmit the portion of the original frames to the analysis terminal in operation 520. FIG. 5 illustrates an example embodiment in which the second terminal 320 directly processes the quality measurement. To this end, operation 520 may include operations 521 to 523. If the separate analysis terminal is used, operations 521 to 523 may be separated from operation 520 and carried out by processing circuitry of the analysis terminal.

In operation 521, the processing circuitry of the second terminal 320 may determine a first quality index using an FR method based on the portion of the original frames to the original frames included in the original video. As described above, original frames included in the original video may be generated to include indices for the original frames. The indices may include time information and/or order information associated with playing of the original frames. In this case, in operation 521, the processing circuitry of the second terminal 320 may determine the first quality index using the FR method based on each of the portion of the original frames to an original frame of the original video having the same index thereto.

In operation 522, the processing circuitry of the second terminal 320 may determine a second quality index using an NR method based on the portion of the original frames. Here, the second terminal 320 may determine the second quality index using the NR method based on the portion of the original frames and a timestamp associated with each frame of the portion of the original frames.

In operation 523, the processing circuitry of the second terminal 320 may generate a final quality index of the video call service based on (e.g., by combining) the first quality index and the second quality index. As described above, with the first quality index determined using the FR method, it may be difficult to evaluate an inter-frame distortion, that is, a screen skip, a screen freezing, and a jerkiness, and the like. With the second quality index determined using the NR method, it is possible to measure various indices, such as a frame rate and/or a resolution of the video call service, an interval between actual transmitted frames, a video skip, a video freezing, a blackness, and/or a jerkiness. Accordingly, a final quality index based on the first and second quality indices may enable the quality of the video call service to be further accurately measured in a mobile environment in which an Internet situation significantly varies.

Figure 6:
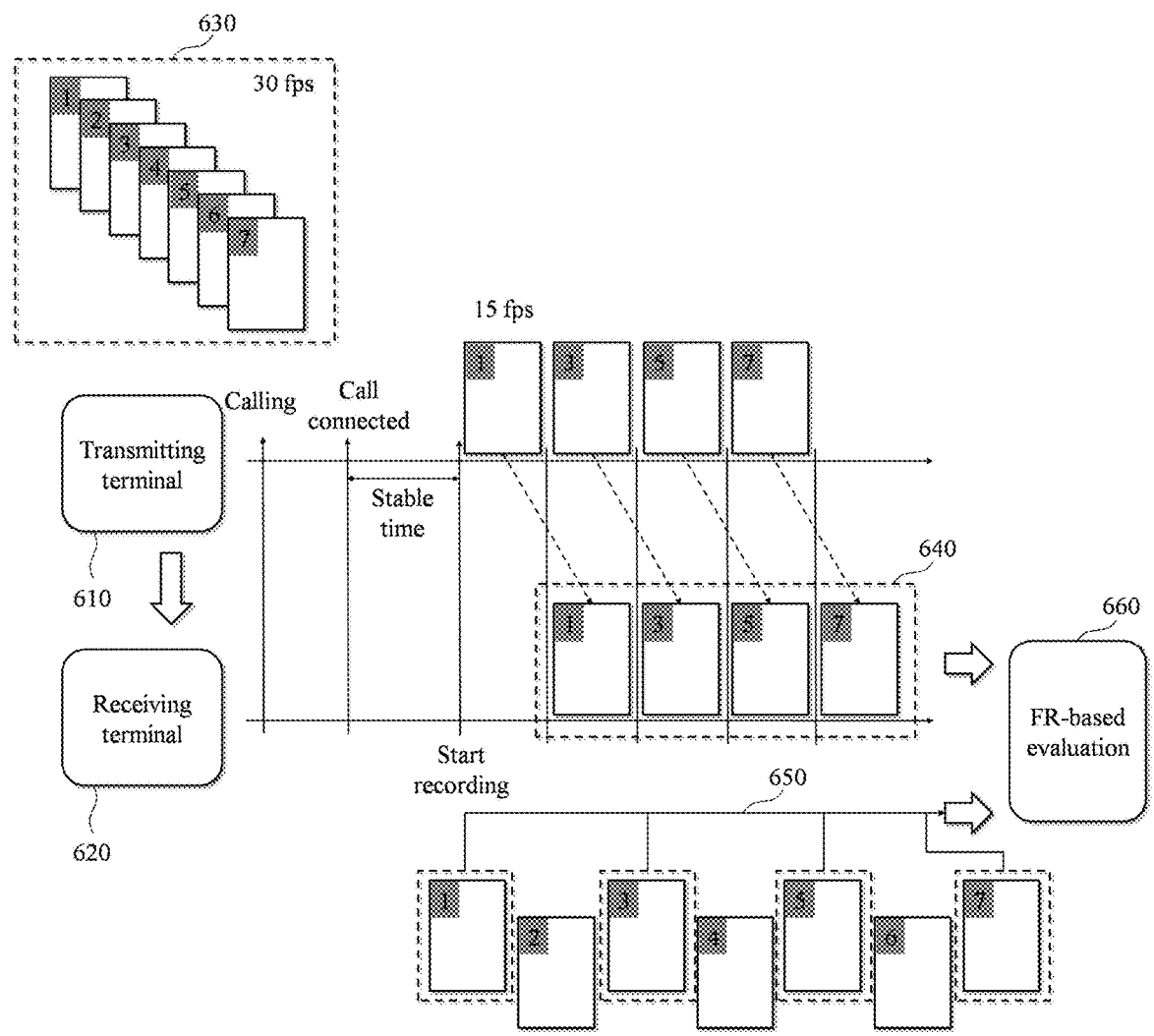
FIG. 6 illustrates an example of performing a quality evaluation using a full-reference (RF) method according to at least one example embodiment.

FIG. 6 illustrates an example of performing a quality evaluation using an FR method according to at least one example embodiment. Once a video call is connected between a transmitting terminal 610 and a receiving terminal 620, processing circuitry of the transmitting terminal 610 may be configured to transmit a video to the receiving terminal 620 after a desired period of a stable time is elapsed. Here, the processing circuitry of the transmitting terminal 610 may be configured to process an original video 630 to be suitable for the video call service, and may transmit original frames of the original video 630 to the receiving terminal 620. FIG. 6 illustrates an example of transmitting a single original frame for every two original frames to transmit the original video 630 of 30 fps through the video call service of 15 fps. That is, when the original frames of the original video 630 are identified with indices of '1, 2, 3, 4, 5, 6, 7, . . . ,' the original frames with indices of '1, 3, 5, 7, . . . ' may be transmitted from the transmitting terminal 610 to the receiving terminal 620. Here, the processing circuitry of the receiving terminal 620 may be configured to process an FR-based evaluation 660 based on received original frames 640 and original frames 650 having the same indices as those of the original frames 640 among original frames of the original video 630 acquired by the receiving terminal 610.

Figure 7:
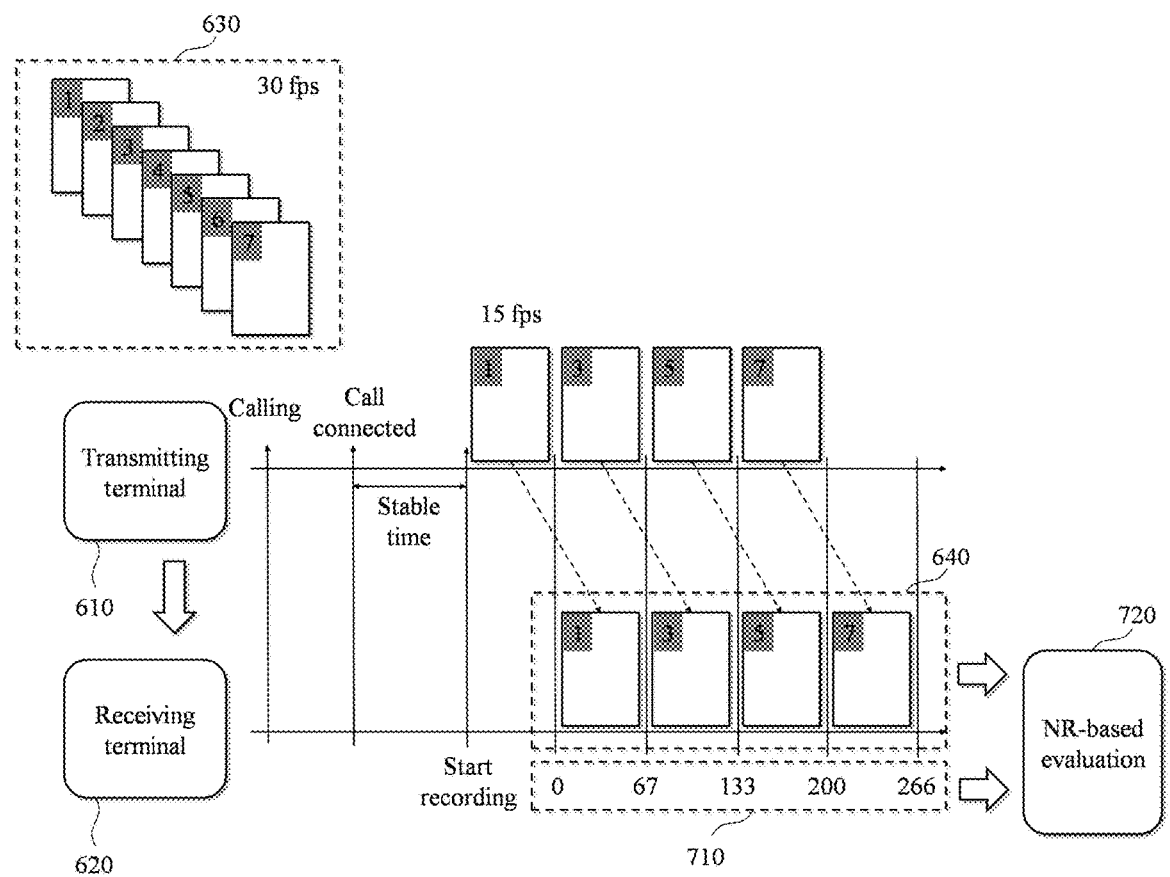
FIG. 7 illustrates an example of performing a quality evaluation using a no-reference (NR) method according to at least one example embodiment.

FIG. 7 illustrates an example of performing a quality evaluation using an NR method according to at least one example embodiment. Similar to the example embodiment of FIG. 6, FIG. 7 illustrates an example in which, in response to the transmitting terminal 610 processing the original video 630 to be suitable for the video call service and transmitting the original frames of the original video 630 to the receiving terminal 620, processing circuitry of the receiving terminal 620 may be configured to receive the original frames 640. Referring to FIG. 7, the processing circuitry of the receiving terminal 620 may be configured to process an NR-based evaluation 720 based on timestamp information 710 including the original frames 640 and times at which the respective original frames 640 are received.

That is, when the original frames of the original video 630 received by the receiving terminal 620 are identified with indices of "1, 3, 5, 7, . . . ," a screen skip and a screen freezing may be measured by linearly or nonlinearly combining, for example, statistical features of index change, such as an interval at which a screen freezing occurs and a number of times the screen freezing occurs. Also, when the original frames 640 of the original frame 630 received by the receiving terminal 620 are identified with indices of "0, 67, 133, 200, . . . ," a jerkiness may be measured using an interval between timestamps and a motion variation of a received original frame.

According to another example embodiment, replacing a video during a video call may be used as technology for providing content to users during the video call.

Figure 8:
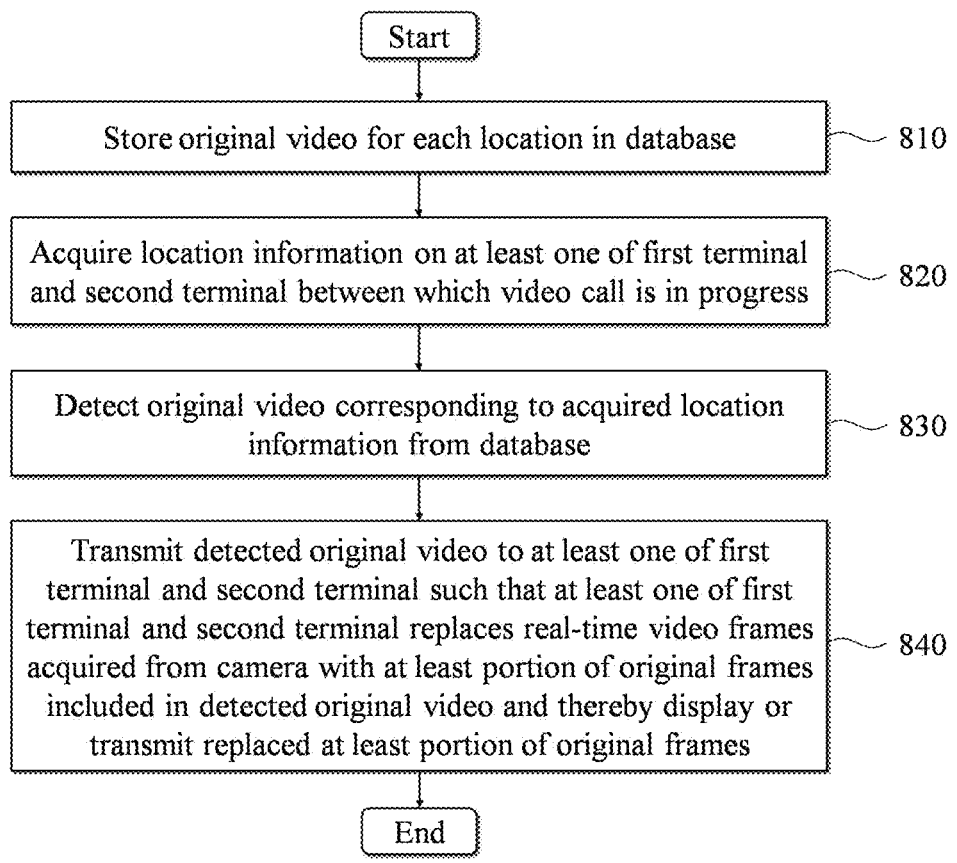
FIG. 8 is a flowchart illustrating an example of a content providing method according to at least one example embodiment.

FIG. 8 is a flowchart illustrating an example of a content providing method according to at least one example embodiment. The content providing method of FIG. 8 may be performed by processing circuitry of a content providing server that is configured by the aforementioned at least one computer apparatus 200. The content providing server may be configured to provide content during a video call between a first terminal and a second terminal. For example, the processing circuitry 220 of the computer apparatus 200 may be configured to execute a control instruction according to a code of at least one program or a code of an OS included in the memory 210. Here, the processing circuitry 220 may be configured to control the computer apparatus 200 to perform operations 810 to 840 included in the method of FIG. 8 in response to a control instruction provided from a code stored in the computer apparatus 200.

Referring to FIG. 8, in operation 810, the computer apparatus 200 may store an original video for each location in a database. The original video may include video content that a content providing server is to provide users. Such an original video for each location may include information associated with a corresponding location and may be registered by a content provider associated with a specific location.

In operation 820, the processing circuitry of the computer apparatus 200 may acquire location information on at least one of the first terminal and the second terminal between which the video call is in progress. The location information may be basically acquired based on GPS coordinates received from at least one of the first terminal and the second terminal, and may be acquired using beacon information or WiFi signal intensity to verify an indoor location of at least one of the first terminal and the second terminal.

In operation 830, the processing circuitry of the computer apparatus 200 may detect an original video corresponding to the acquired location information from the database. For example, an original video B registered in association with a place A identified based on location information may be detected from the database.

In operation 840, the processing circuitry of the computer apparatus 200 may transmit the detected original video to at least one of the first terminal and the second terminal such that at least one of the first terminal and the second terminal replaces real-time video frames acquired from a camera with at least a portion of original frames included in the detected original video and displays or transmits the portion of the original frames. In this case, processing circuitry of at least one of the first terminal and the second terminal may process original frames included in the transmitted original video based on at least one of a frame rate and/or a resolution of the video call service, may replace the real-time video frames acquired from the camera with at least a portion of the original frames and display or transmit the portion of the original frames. In this manner, content according to the original video may be displayed on the first terminal and/or the second terminal during the video call. Accordingly, not a real-time video acquired for an existing video call but a processed original video may be displayed on a display of at least one of the first terminal and the second terminal. At least one of the first terminal and the second terminal may acquire information associated with a location or a place at which a corresponding terminal is currently present or information associated with a location or a place at which a counterpart of the video call is currently present.

As described above, according to some example embodiments, it is possible to replace real-time video frames acquired from a camera of a transmitting terminal with a portion of an original video and transmit the portion of the original video during a video call, to analyze the original video received at a receiving terminal, and to measure quality of a video call service. Also, it is possible to generate a quality index with respect to all of an FR method and an NR method based on the original frames of the received original video and an index and a timestamp of each original frame. Also, it is possible to provide contents to terminals during a video call by replacing the real-time video frame acquired from the camera based on a location with the original video.

The systems and/or apparatuses described herein may be implemented using hardware components, software components, a hardware/software combination such as a processor executing software, and/or a combination thereof. For example, a processor may be implemented using one or more general-purpose or special purpose computers, such as, for example, a central processing unit (CPU), a controller, an arithmetic logic unit (ALU), a digital signal processor, a microcomputer, a field programmable gate array (FPGA), a System-on-Chip (SoC), a programmable logic unit (PLU), a microprocessor, an application-specific integrated circuit (ASIC), or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple elements of processing circuitry and/or multiple types of processing circuitry. For example, processing circuitry may include multiple processors or a processor and a controller. In addition, different processing configurations of processing circuitry are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD-ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of measuring quality of a video call at a transmitting terminal including processing circuitry, the method comprising:
   processing, by the processing circuitry, original frames included in an original video based on a video call service;
   replacing, by the processing circuitry, real-time video frames acquired from a camera for a video call with a receiving terminal with a portion of the processed original frames; and
   transmitting, by the processing circuitry, to the receiving terminal through the video call service, the portion of the processed original frames as frames for the video call to cause the receiving terminal to determine quality of the video call service based on each frame of the portion of the processed original frames and a frame of the original video that has been acquired by the receiving terminal and has a same index as that of a corresponding frame of the portion of the processed original frames by,
   determining a first quality index using a full-reference (FR) method based on the portion of the processed original frames and the original frames included in the original video; and
   determining a second quality index using a no-reference (NR) method based on the portion of the processed original frames and a timestamp associated with each frame of the portion of the processed original frames, the timestamp including times at which respective frames of the portion of the processed original frames are received.

2. The method of claim 1, wherein the processing comprises processing, by the processing circuitry, each of the original frames included in the original video based on at least one of a frame rate and/or a resolution of the video call service.

3. A method of measuring quality of a video call at a receiving terminal including processing circuitry, the method comprising:
   receiving, by the processing circuitry from a transmitting terminal through a video call service, a portion of original frames included in an original video, the portion of the original frames having replaced real-time video frames acquired from a camera for the video call service; and
   processing, by the processing circuitry, quality of the video call service based on each frame of the portion of the original frames and a frame of the original video stored in the receiving terminal and having a same index as that of a corresponding frame of the portion of the original frames, the processing including,
      determining a first quality index using a full-reference (FR) method based on the portion of the original frames and frames included in the original video, and
      determining a second quality index using a no-reference (NR) method based on the portion of the original frames and a timestamp associated with each frame of the portion of the original frames, the timestamp including times at which respective frames of the portion of the original frames are received.

4. The method of claim 3, wherein the processing comprises:
   generating, by the processing circuitry, a final quality index of the video call service based on the first quality index and the second quality index.

5. The method of claim 4,
   wherein the original frames included in the original video are generated to include indices for the original frames, and
   the determining the first quality index includes determining, by the processing circuitry, the first quality index using the FR method based on each frame of the portion of the original frames and a frame of the original video acquired by the receiving terminal and having the same index as that of a corresponding frame of the portion of the original frames.

6. The method of claim 3, wherein the processing comprises transmitting, by the processing circuitry, the portion of the original frames to an analysis terminal.

7. A method of configuring a content providing server including processing circuitry to provide content during a video call between a first terminal and a second terminal, the method comprising:
   storing, by the processing circuitry, a respective original video for each location in a database;
   acquiring, by the processing circuitry, location information on at least one of the first terminal and the second terminal between which the video call is in progress;
   detecting, by the processing circuitry, an original video corresponding to the location information acquired from the database;
   transmitting, by the processing circuitry, the original video to at least one of the first terminal or the second terminal such that at least one of the first terminal or the second terminal replaces real-time video frames acquired from a camera with a portion of original frames included in the original video; and
   transmitting, by the processing circuitry, the portion of the original frames to determine quality of the video call based on each frame of the portion of the original frames and a frame of the original video that has a same index as that of a corresponding frame of the at least a portion of the original frames by, determining a first quality index using a full-reference (FR) method based on the portion of the original frames and frames included in the original video, and determining a second quality index using a no-reference (NR) method based on the portion of the original frames and a timestamp associated with each frame of the portion of the original frames, the timestamp including times at which respective frames of the portion of the original frames are received.

8. The method of claim 7, wherein at least one of the first terminal and the second terminal is configured to process the frames included in the original video based on at least one of a frame rate and/or a resolution of a video call service, to replace real-time video frames acquired from the camera with the portion of the original frames and display or transmit the portion of the original frames.

9. A transmitting terminal, comprising:
processing circuitry configured to,
  process original frames included in an original video based on a video call service,
  replace real-time video frames acquired from a camera for a video call with a receiving terminal with at least a portion of the processed original frames, and
  transmit to the receiving terminal through the video call service, the at least a portion of the processed original frames as frames for the video call with the receiving terminal, to determine a quality index of the video call service to cause the receiving terminal to determine quality of the video call service based on each frame of the at least a portion of the processed original frames and a frame of the original video that has been acquired by the receiving terminal and has a same index as that of a corresponding frame of the at least a portion of the processed original frames by
    determining a first quality index using a full-reference (FR) method based on the at least a portion of the processed original frames and frames included in the original video, and
    determining a second quality index using a no-reference (NR) method based on the at least a portion of the processed original frames and a timestamp associated with each frame of the at least a portion of the processed original frames, the timestamp including times at which respective frames of the at least a portion of the processed original frames are received.

10. The transmitting terminal of claim 9, wherein the receiving terminal or an analysis terminal linked with the receiving terminal is configured to
generate a final quality index of the video call service based on the first quality index and the second quality index.

11. A receiving terminal, comprising:
processing circuitry configured to,
receive, from a transmitting terminal through a video call service, at least a portion of original frames included in an original video, the at least a portion of the original frames being received through the video call service by replacing real-time video frames acquired from a camera for the video call service with the at least a portion of the original frames at the transmitting terminal, and
process quality of the video call service based on each frame of the at least a portion of the original frames and a frame of the original video stored in the receiving terminal and having a same index as that of a corresponding frame of the at least a portion of the original frames by,
  determining a first quality index using a full-reference (FR) method based on the at least a portion of the original frames and frames including in the original video, and
  determining a second quality index using a no-reference (NR) method based on the at least a portion of the original frames and a timestamp associated with each frame of the at least a portion of the original frames, the timestamp including times at which respective frames of the at least a portion of the original frames are received.

12. The receiving terminal of claim 11, wherein the processing circuitry is configured to
generate a final quality index of the video call service based on the first quality index and the second quality index.

* * * * *